EVELYN L. EDWARDS.
DOUGH-KNEADING MACHINE.
No. 186,717. Patented Jan. 30, 1877.
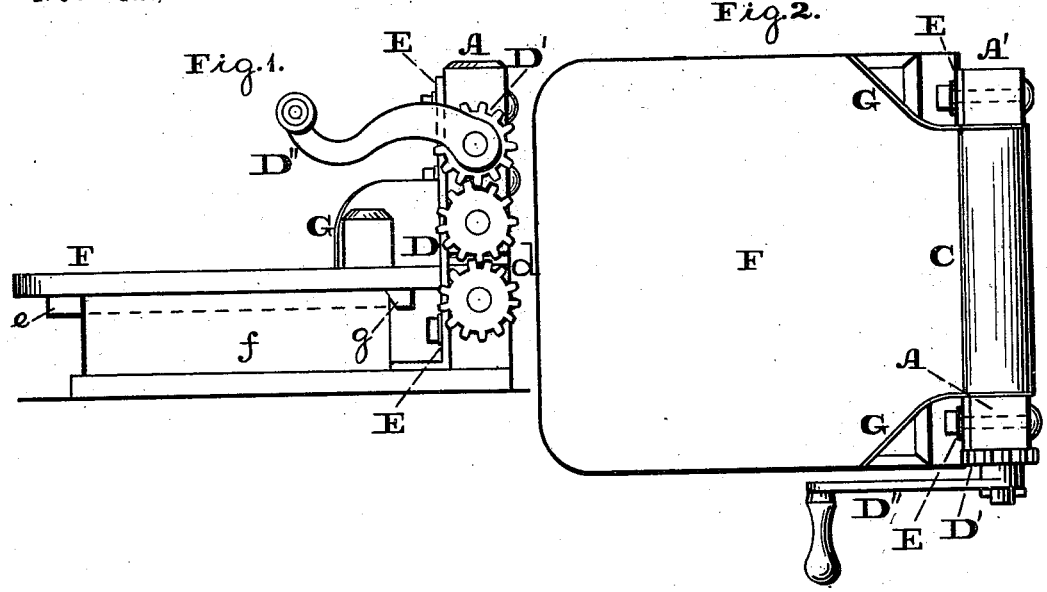
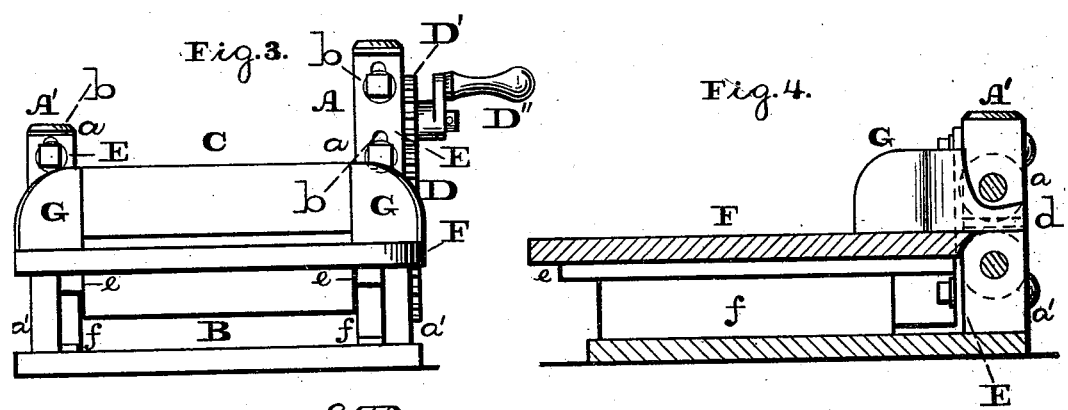
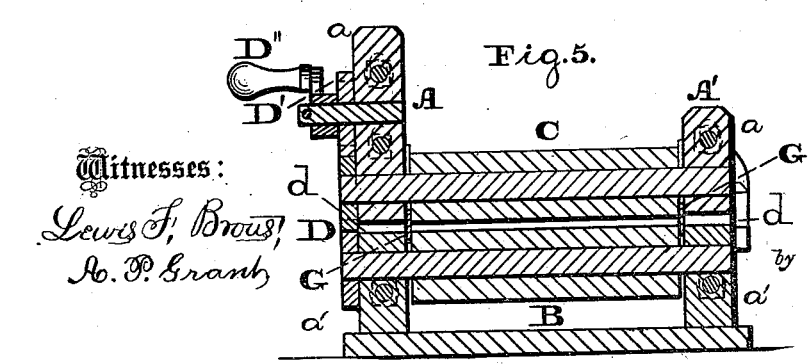
Witnesses:
Lewis F. Brous
A. P. Grant
Inventor:
Evelyn L. Edwards
by John A. Wiedersheim
Attorney.

UNITED STATES PATENT OFFICE.

EVELYN L. EDWARDS, OF VINELAND, NEW JERSEY.

IMPROVEMENT IN DOUGH-KNEADING MACHINES.

Specification forming part of Letters Patent No. 186,717, dated January 30, 1877; application filed April 8, 1876.

*To all whom it may concern:*

Be it known that I, EVELYN L. EDWARDS, of Vineland, in the county of Cumberland and State of New Jersey, have invented a new and useful Improvement in Apparatus for Kneading Dough; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a side view of the apparatus embodying my invention. Fig. 2 is a top or plan view thereof. Fig. 3 is an end view thereof. Fig. 4 is a longitudinal section in line $x\, x$, Fig. 2. Fig. 5 is a transverse section in line $y\, y$, Fig. 2.

Similar letters of reference indicate corresponding parts in the several figures.

My invention relates to improvements in the class of apparatus for kneading, molding, rolling, working, or pressing dough; and it consists of two rollers rotating in opposite directions on rigid bearings, whereby the dough will be firmly compressed, bubbles removed therefrom, and the mass well mixed, said rollers being rendered adjustable relatively to requisite thicknesses of dough for bread, cakes, pies, &c. It also consists of an extended bearing for supporting a gear-wheel at an elevation, whereby the crank will not strike the table or article on which the apparatus is placed.

Referring to the drawings, A A' represent two uprights, each of which is formed in sections $a\, a'$, and on the lower sections is mounted a roller, B, and on the upper sections a roller, C, the two rollers rotating in opposite directions by means of gearing D, to which power is communicated by a gear-wheel, D', having connected to it a crank, D'', for which purpose the upright A is extended sufficiently high to provide bearings for said wheel D', whereby the crank D'' may be rotated without striking the table or place on which the apparatus is rested or supported. The upper sections $a$ of the uprights are connected to vertical plates E, which are secured to the base of the apparatus, and slots $b\, b$ are formed in the plates for the passage of the bolts which connect the said plates E and sections $a$ whereby said upper sections $a$ may be raised and lowered, so that the upper roller may be moved nearer to, or farther from, the lower roller, and thus the two rollers may be adjusted relatively to thickness or consistency that the dough is required to be made for purposes of bread, cakes, &c. F represents a board or table, to the sides of one end of which are secured guides G, which extend vertically and longitudinally, so as to be inserted between the sides of the rollers and adjacent faces of the uprights A A', and close the sides of the joints between the two rollers, and also close the spaces $d$ between the upper and lower sections of the uprights The raised dough will be cut or otherwise separated into pieces of desired size and heavily pressed or flattened, by hand or otherwise on the board or table F, well floured. The piece of dough, well floured, is now passed between the rollers, properly rotated, and as the dough will be pressed in opposite directions by the two rotating rollers, it is evident that as the rollers do not yield, owing to their rigid bearings, the mass will be firmly compressed and well mixed, and the bubbles removed therefrom.

The lateral tendency of the dough is resisted by the guides G, whereby the dough cannot reach and clog the journals of the rollers, or enter between the rollers and uprights, or escape through the spaces $d$.

In order that the parts may be washed or cleansed, as desired or necessary, the board or table F will be made removable. For this purpose the under side of the board is formed with guides or lugs $e$, which fit against the supports $f\, f$, and prevent lateral displacement of the board, but which are readily detachable from the supports. The ends of the board adjacent to the rollers have downwardly-projecting lugs $g$, which engage with the supports $f$, for preventing longitudinal movements of the board, but which are readily detachable from the supports.

Having thus described my invention, what I claim as new, and desire to secure by Letters Patent, is—

1. The dough-kneading rollers B C, mounted on separated sections $a$ $a'$ of uprights A A', in combination with the slotted plates E, substantially as and for the purpose set forth.

2. The combination, with dough-kneading rollers B C and support A', of the extended support A for the gear-wheel D' and crank D'', substantially as and for the purpose set forth.

EVELYN L. EDWARDS.

Witnesses:
 CHARLES J. NOURSE,
 LUCY S. NOURSE.